United States Patent [19]
Heyl

[11] Patent Number: 5,887,177
[45] Date of Patent: Mar. 23, 1999

[54] HOST-CONTROLLED POWER MANAGEMENT OF A COMPUTER SOUND SYSTEM

[75] Inventor: Lawrence Frederick Heyl, Mountain View, Calif.

[73] Assignee: Apple Computer, Inc., Cupertino, Calif.

[21] Appl. No.: 671,961

[22] Filed: Jun. 28, 1996

[51] Int. Cl.$^6$ .................................................. G06F 1/32
[52] U.S. Cl. ............................... 395/750.01; 395/750.03; 341/110
[58] Field of Search .............................. 395/750, 750.01, 395/750.02, 750.03–750.06, 750.08; 341/110, 143, 144

[56] References Cited

U.S. PATENT DOCUMENTS

| | | | |
|---|---|---|---|
| 5,436,588 | 7/1995 | Ghaffaripour | 327/538 |
| 5,589,830 | 12/1996 | Linz et al. | 341/110 |

*Primary Examiner*—Meng-Ai T. An
*Assistant Examiner*—Ario Etienne
*Attorney, Agent, or Firm*—Burns, Doane, Swecker & Mathis, L.L.P.

[57] ABSTRACT

A power management scheme for the sound system of a computer is flexible, low-cost, and effective, both to minimize power consumption and to avoid any attendant audio artifacts. More particularly, a mix of relatively simple hardware functions are manipulated by host computer software to change the power management state of an audio codes. Because changing the audio codec power management state can cause annoying artifacts to be coupled to the audio outputs, circuitry is provided to preclude these artifacts, switched in concert with the power control circuitry. The rate at which the audio codec's internal analog reference voltage equilibrates when power is applied or removed is controlled. This prevents coupling of a step to the audio outputs, which otherwise would make a large "pop." The rate at which the analog output capacitors are charged when power is applied is also controlled, preventing a "pop" from being coupled to the analog outputs. A programmable current sink is provided to discharge the output coupling capacitors when power is removed. This allows removal of power without annoying artifacts. Further in accordance with the invention, various power management states are defined, and a limit is placed on the allowable amount of "pop" energy deliverable at the audio outputs during a state transition.

1 Claim, 14 Drawing Sheets

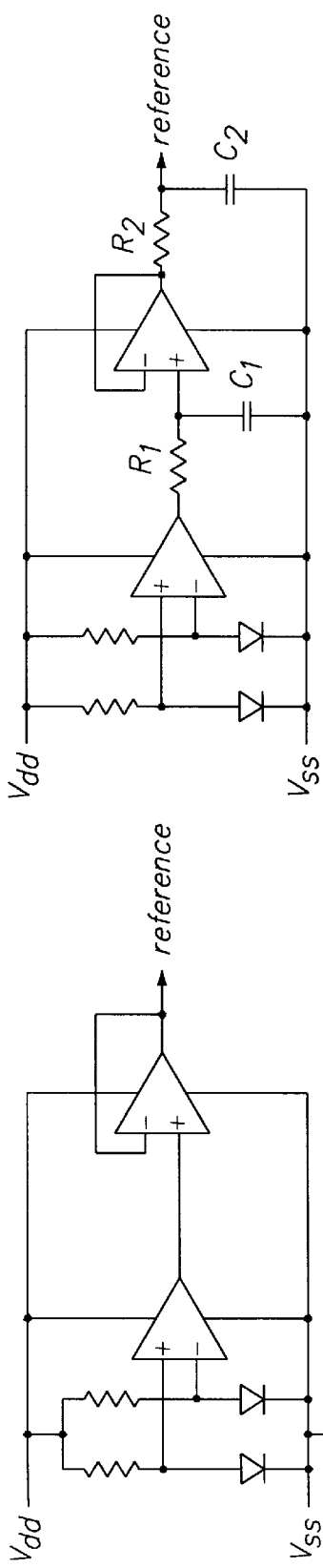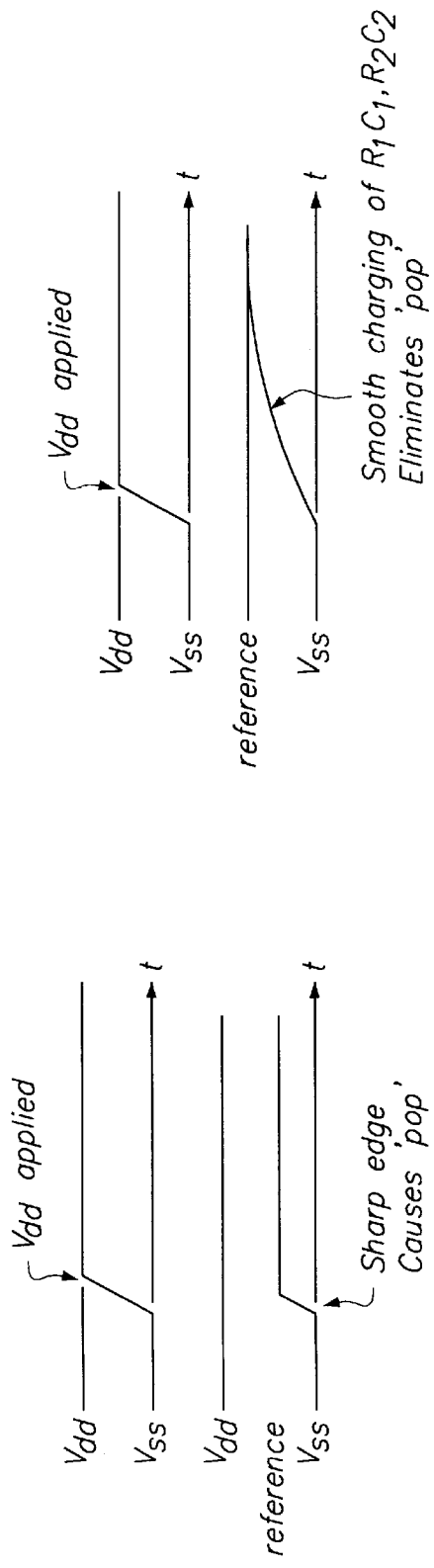
FIG. 16
FIG. 17
FIG. 14 (PRIOR ART)
FIG. 15 (PRIOR ART)

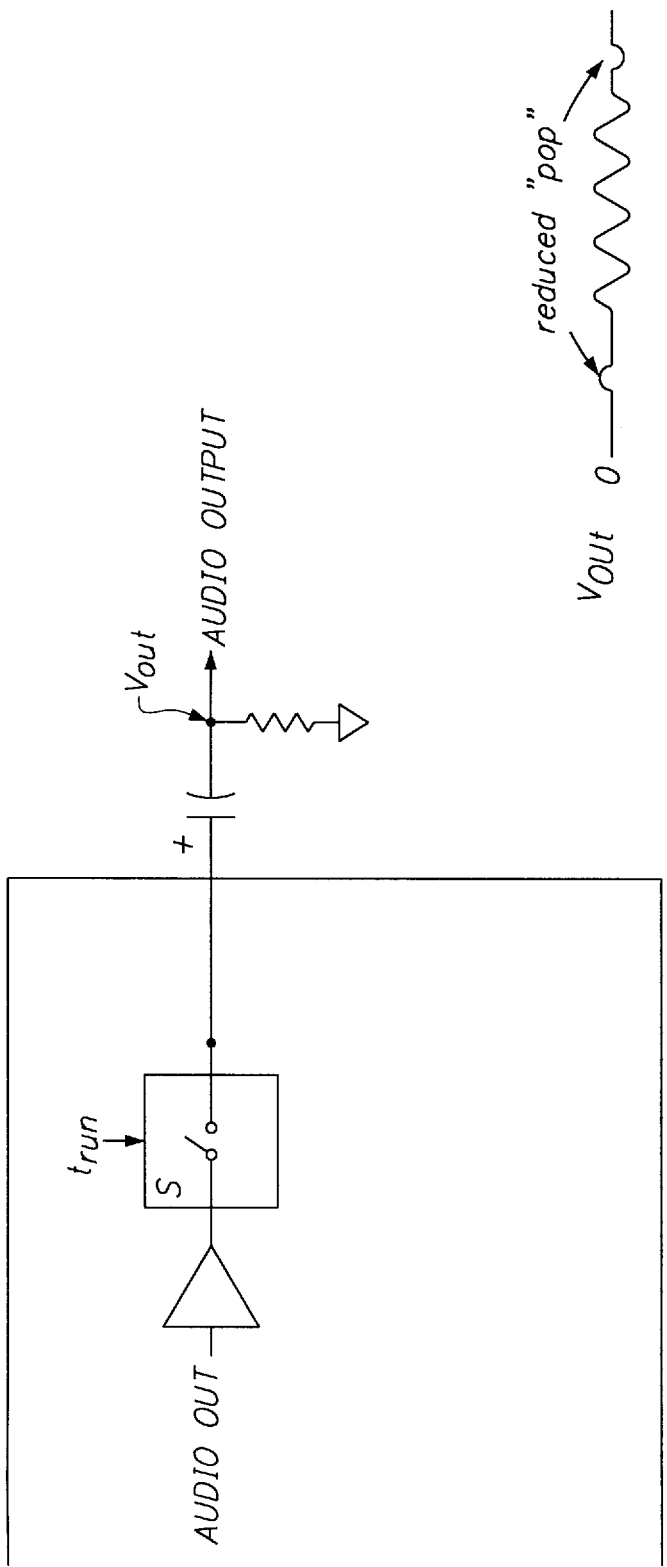
FIG. 18 (PRIOR ART)
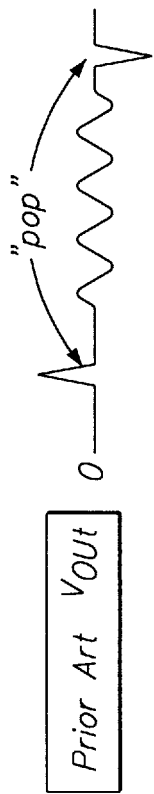
FIG. 21
FIG. 19

HOST-CONTROLLED POWER MANAGEMENT OF A COMPUTER SOUND SYSTEM

FIELD OF THE INVENTION

The present invention relates to power management of computer sound systems, particularly for portable computers.

STATE OF THE ART

As personal computers continue to be refined in function and performance, their internal sound systems have likewise been refined to achieve a standard of audio quality and performance established by the introduction of the Compact Disc™ digital audio system. This has required the improved implementation of internal computer sound functions to provide a "user experience" consistent with the inexpensive, high-quality CD system. In addition, makers of portable computers and many desktop computers have become more conscious of a need to actively manage the amount of power they consume. This is paramount with a portable computer, and a forward-looking desire with respect to desktop computers.

Many solutions exist for power control to eliminate clicks and pops in audio equipment, particularly in relation to audio amplifiers. There nevertheless exists a need for a power management scheme for the sound system of a computer that is flexible, low-cost, and effective, both to minimize power consumption and to avoid any attendant audio artifacts. Such a power management scheme would be particularly applicable to an audio codec (Coder-DeCoder), i.e., a circuit that performs A/D conversion of input sound signals q and D/A conversion of output sound signals. The present invention addresses this need.

SUMMARY OF THE INVENTION

These needs have been taken together to define a means to manage the power of a computer sound system, and to assure that the power management process will not cause annoying or disruptive artifacts, such as clicks or pops. More particularly, a mix of relatively simple hardware functions are manipulated by host computer software to change the power management state of an audio codec. Because changing the audio codec power management state can cause annoying artifacts to be coupled to the audio outputs, circuitry is provided to preclude these artifacts and is switched in concert with the power control circuitry. The rate at which the audio codec's internal analog reference voltage equilibrates when power is applied or removed is controlled. This prevents coupling of a step to the audio outputs, which otherwise would make a large "pop." The rate at which the analog output coupling capacitors are charged when power is applied is also controlled, preventing a "pop" from being coupled to the analog outputs. A programmable current sink is provided to discharge the output coupling capacitors when power is removed. This allows removal of power without annoying artifacts. Further in accordance with the invention, various power management states are defined, and a limit is placed on the allowable amount of "pop" energy deliverable at the audio outputs during a state transition.

BRIEF DESCRIPTION OF THE DRAWING

The present invention may be further understood from the following description in conjunction with the appended drawing. In the drawing:

FIG. 14 is a schematic diagram of a conventional power supply circuit for an audio codec;

FIG. 15 is a timing diagram pertaining to the power supply circuit of FIG. 14;

FIG. 16 is a schematic diagram of a power supply circuit for an audio codec in accordance with the present invention;

FIG. 17 is a timing diagram pertaining to the power supply circuit of FIG. 16;

FIG. 18 is a simplified diagram of a conventional output circuit for an audio codec;

FIG. 19 is a timing diagram pertaining to the output circuit of FIG. 18;

FIG. 21 is a timing diagram pertaining to the output circuit of FIG. 20.

DETAILED DESCRIPTION OF THE PREFERRED EMBODIMENT

Figure 1:
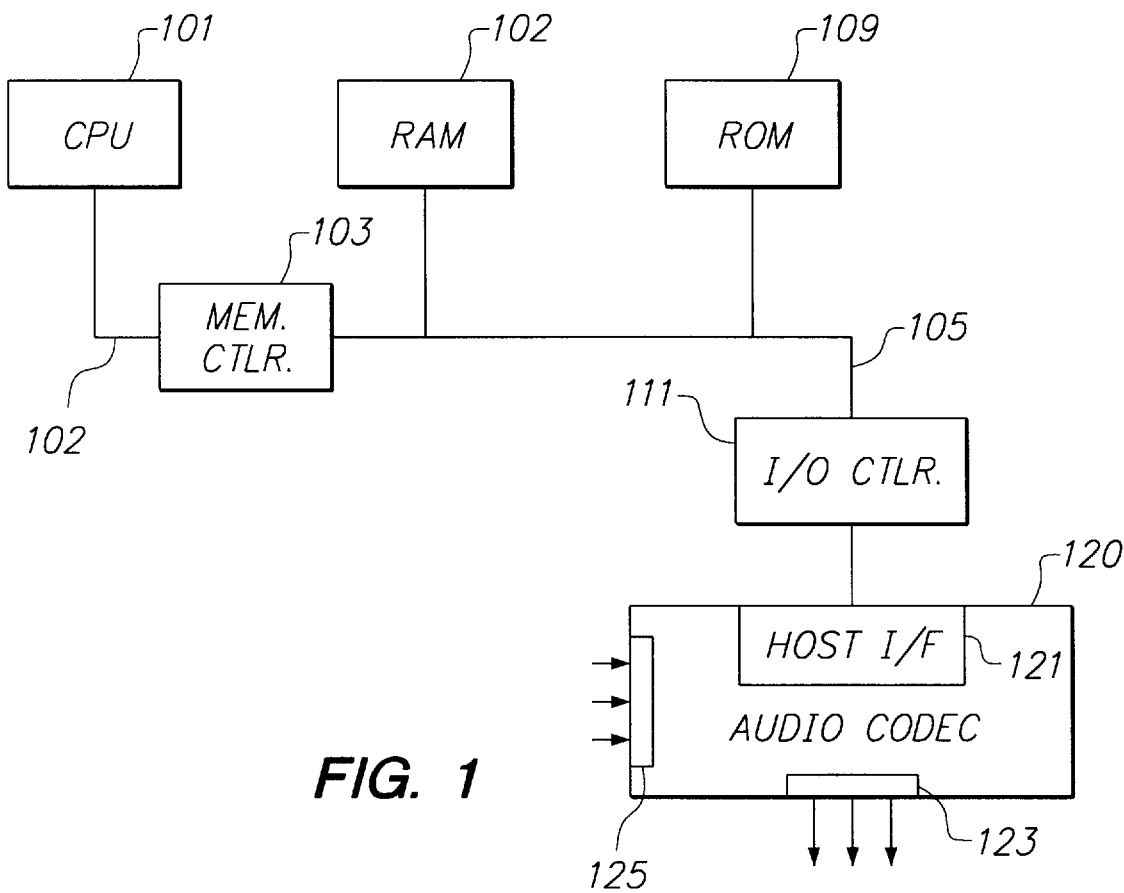
FIG. 1 is a block diagram of a computer system in which the present invention may be used.

Referring to FIG. 1, a computer system in which the present power management system may be used is shown. A CPU 101 is coupled by a bus 102 to a memory controller 103. The memory controller 103 is coupled to a bus 105. To the bus 105 are coupled RAM 107, ROM 109 and an I/O controller 111. The computer configuration described should be understood as being merely exemplary of a wide variety of computer configurations and architectures in which the present invention may be employed.

The I/O controller 111 is coupled to an audio codec 120, in particular a host interface 121 thereof. The audio codes 120 has an output block 123 that produces various audio outputs. The audio codec also has an input block 125 to which various audio inputs may be connected.

Figure 2:
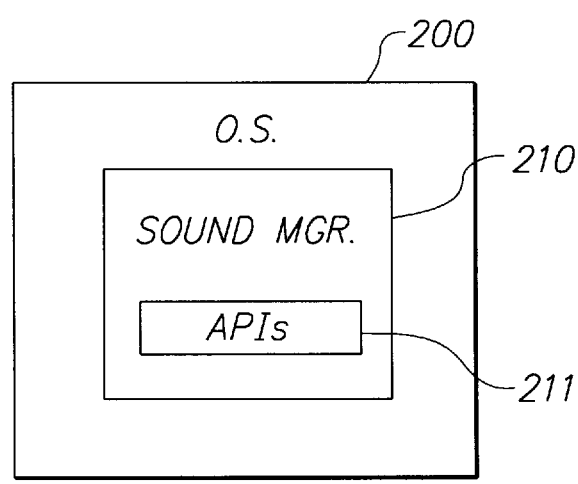
FIG. 2 is a block diagram illustrating the software environment of the power management system.

Referring to FIG. 2, illustrating the software environment of the power management system, the computer runs under the control of an operating system 200, such as the Macintosh Operating System. As part of the operating system there is provided a Sound Manager 210. The Sound Manager includes Application Program Interfaces (APIs) 211 to the audio codec to enable the functions of the audio codec to be controlled by host computer software.

Figure 3:
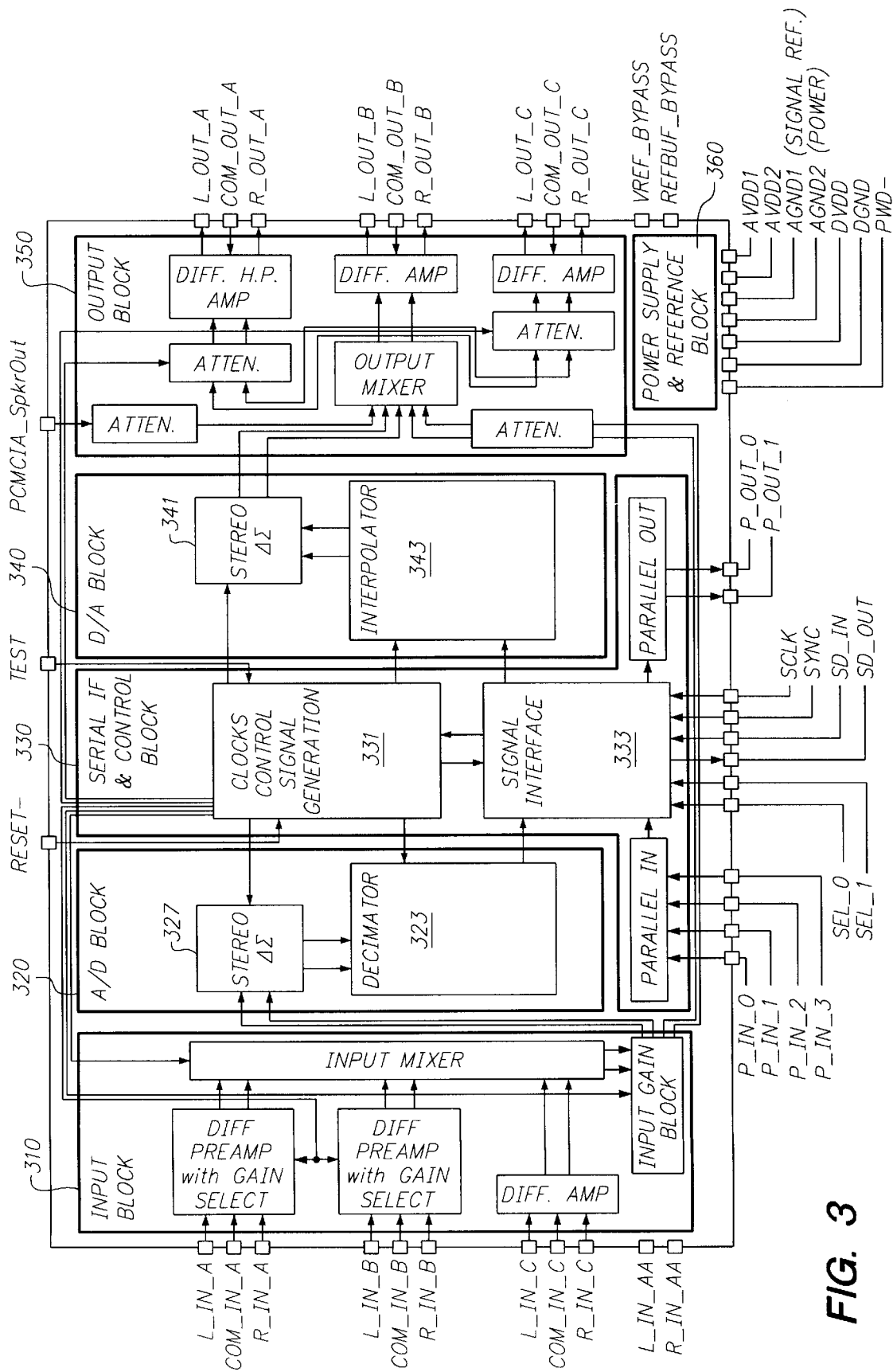
FIG. 3 is a block diagram of an audio codec provided with power management functions in accordance with the present invention.

Referring to FIG. 3, the audio codec of FIG. 1 will be described in greater detail. The audio codec contains six principal blocks, including an input block 310, an A/D conversion block 320, a serial interface and control block 330, a D/A block 340, an output block 350 and a power supply and reference block 360.

The power supply block 360 receives two separate analog power inputs (AVDD1, AVDD2) and two separate analog ground inputs (AGND1, AGND2). One of the analog grounds (AGND1) is used as a signal reference and the other (AGND2) is used as power ground. The power supply block also receives digital power (DVDD) and ground (DGND) and a power-down control signal, PWD. The power supply block generates a quiet reference voltage to bias the analog blocks of the audio codec and, under host control, implements various power management features to be described in greater detail hereinafter.

The manner in which the quiet reference voltage is generated differs in significant respects from the prior art. A conventional circuit for generating the reference voltage is shown in FIG. 14. As seen in the accompanying timing diagram of FIG. 15, when Vdd is applied to the circuit, the supply voltage quickly ramps from Vss to Vdd. A short time thereafter, the reference voltage likewise ramps quickly from Vss to the reference value. The sharp edge of the waveform causes a "pop" to be produced by the sound system.

Referring to FIG. 16, in the power supply circuit of the present audio codec, RC circuits $R_1C_1$ and $R_2C_2$ are added to the conventional circuit. As seen in the accompanying waveform diagram of FIG. 17, the smooth charging of $R_1C_1$ and $R_2C_2$ eliminates the "pop" characteristic of the circuit of FIG. 14.

Figure 4:
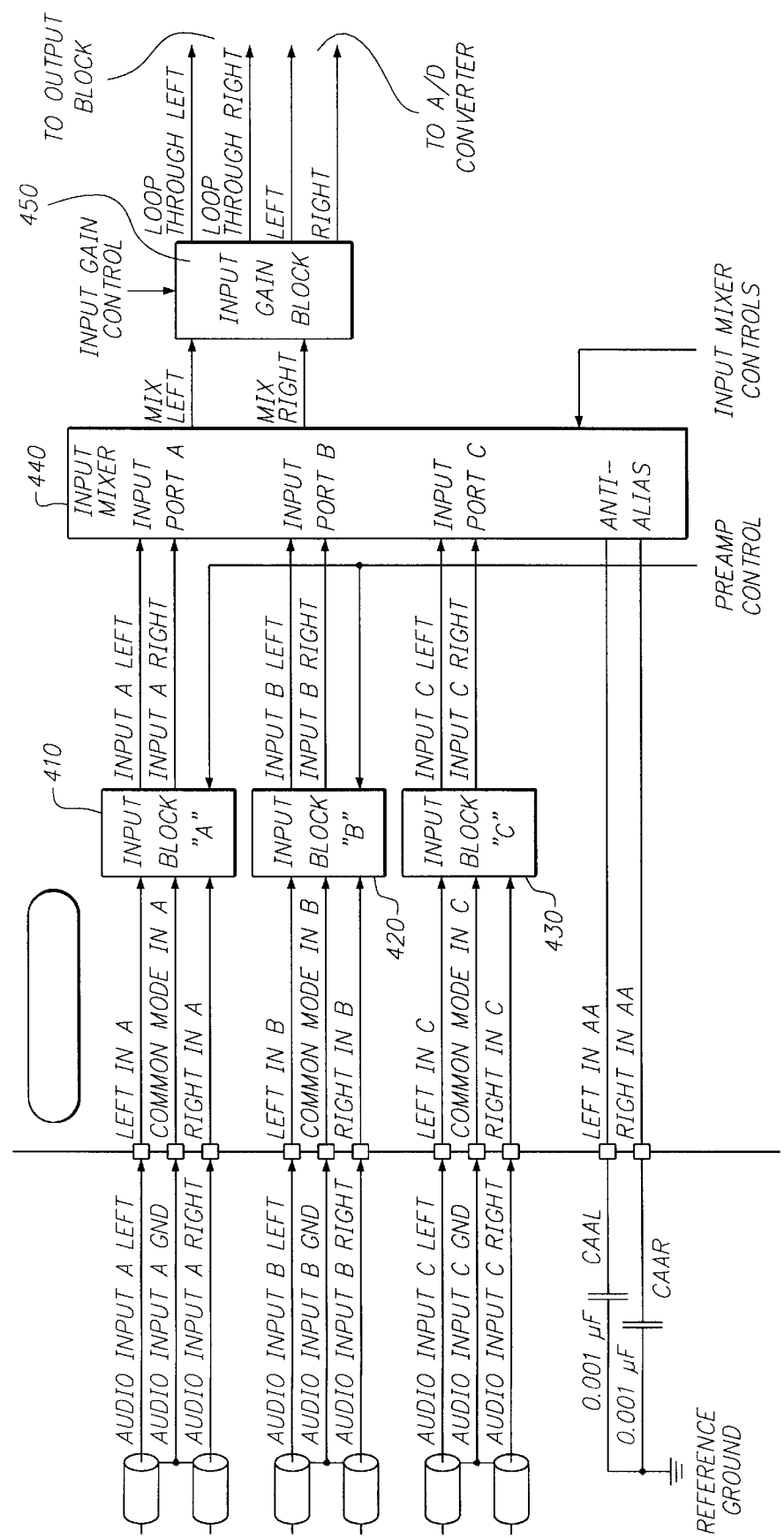
FIG. 4 is a block diagram of an input block portion of the audio codec of FIG. 3.

Referring to FIG. 4, the audio input block receives three stereo audio inputs, A, B and C, each audio input having three signals: audio input left, audio input right and audio input ground. The input block consists of five principal components: three pseudo-differential stereo input stages 410, 420 and 430 (described more particularly in U.S. Pat. No. 5,517,572), an input mixer block 440, and a stereo gain block 450. The input signals are mixed within the mixer in accordance with input mixer control signals. After the input signals have passed through the input mixer, they are run through a pair of antialias filters (one for each channel). Capacitors $C_{AAL}$ and $C_{AAR}$ for these filters are located off chip because of their size.

Figure 5:
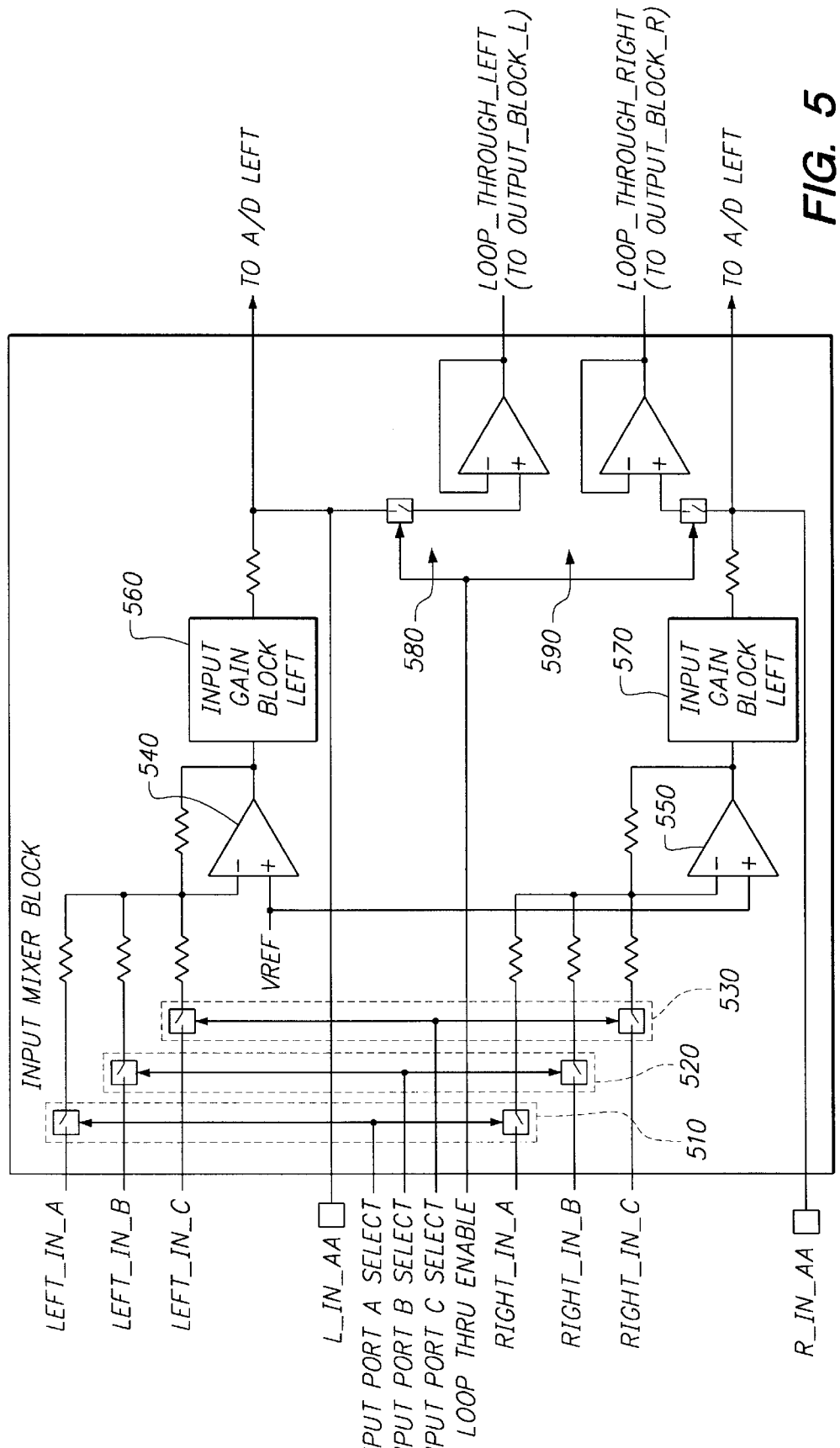
FIG. 5 is a block diagram of an input mixer block portion of the input block of FIG. 4.

Referring to FIG. 5, the input mixer block follows the input stages and connects the three sets of stereo inputs with two sets of stereo outputs. The input mixer block functions as an input source selector. Three pairs of switches (510, 520, 530) are provided, one pair for each set of stereo inputs. For each switch pair, one switch is connected to a left channel amplifier 540 and the other is connected to a right channel amplifier 550. The input selection is controlled by selected bits in the serial data stream from the host, as described hereinafter. The external antialiasing capacitors of FIG. 4 are connected to the input mixer.

The input gain blocks 560 and 570, in an exemplary embodiment, produce uniform gain over the full 20 kHz audio bandwidth, with the gain for each channel being separately adjustable. Since it is likely that these control values will be adjusted during recording, care must be taken to minimize any audible artifacts due to gain changes. As with the input source selection, the left and right channel input gain values are controlled by the serial data stream.

The first pair of outputs from the input gain blocks (A/D left, A/D right) is connected to the A/D converter inputs. The second pair of outputs (Loop_Through_left, Loop_Through_Right) is produced by loop-through amplifiers 580 and 590 and is connected to the output block.

Referring again to FIG. 3, the A/D block includes a stereo sigma-delta A/D converter 321 and a decimator 323.

The D/A converter includes an interpolator 343 and a sigma-delta D/A converter 341. The D/A converter implements a Mute function that allows the output ports to be silenced without clicks or pops. In a preferred embodiment, the mute function is not responsible for squelching the output from some non-zero value to mute without a click, but it is required to go from silence to "muted" silence without any audible artifacts.

The A/D and D/A converters require periodic recalibration. Recalibration may occur upon request from the serial bus master or may be automatically initiated by the audio codec after either returning from reset mode or from power-up. The output of the D/A converter must be silenced during the calibration phase to prevent non-audio data from reaching any of the output ports, independent of the individual output muting function. After returning from a calibration phase, the output mute function will be enabled regardless of the state of the mute function before the calibration was begun, ensuring silence instead of low-level channel noise.

Figure 6:
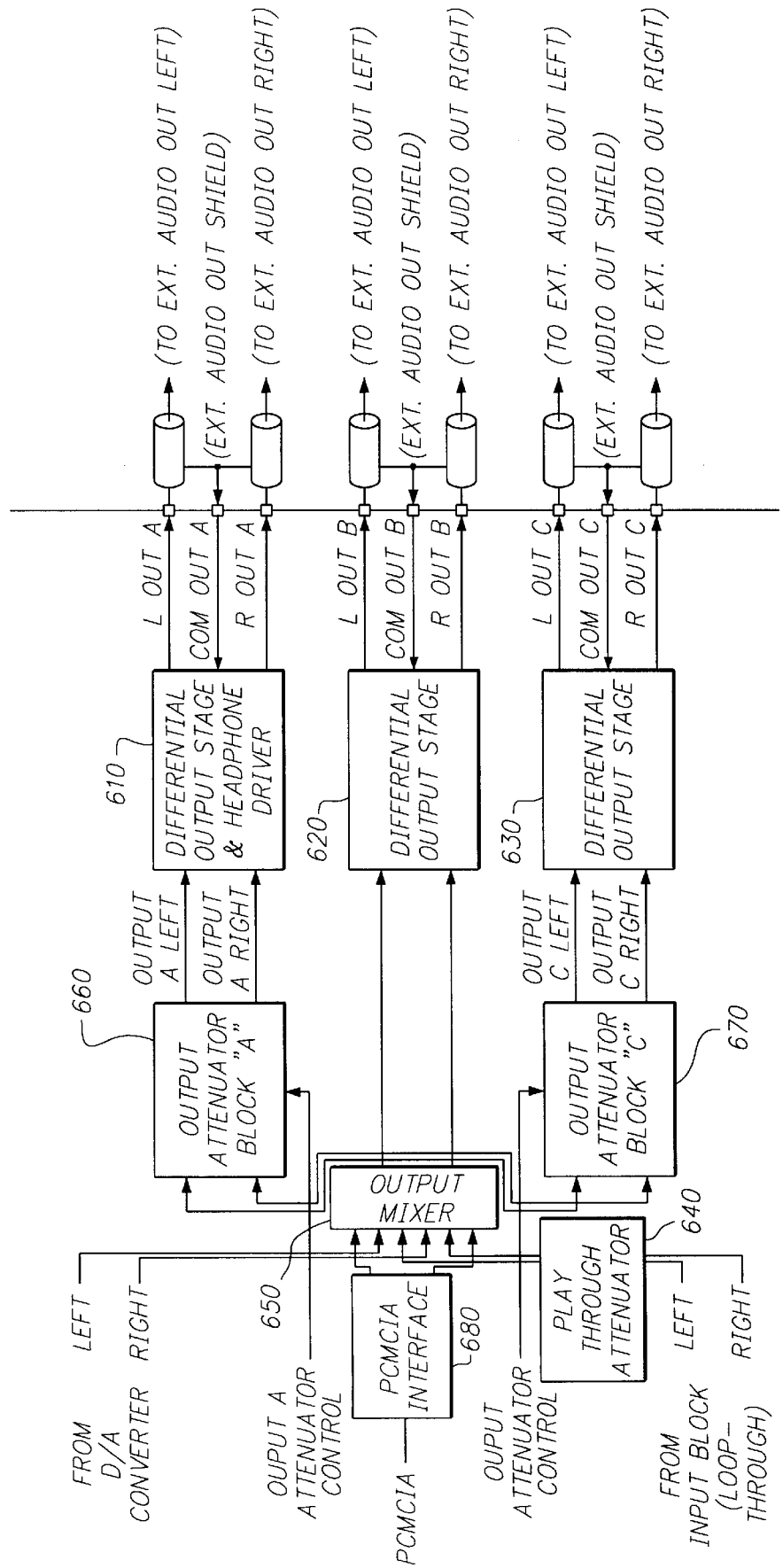
FIG. 6 is a block diagram of the output block portion of the audio codec of FIG. 3.

Referring to FIG. 6, the output block mixes the D/A outputs, the play-through outputs, and a PCMCIA output, and drives the three output ports by means of differential output stages 610, 620 and 630. The play-through outputs are applied to a stereo step attenuator 640 before they are summed in the output mixer 650. Ports A and C have independent stereo attenuators (660, 670) that can adjust the level of each channel. Port B is a fixed-level line output.

Most portable computers are equipped with a PCMCIA slot. The PCMCIA bus, in its alternate mode, can generate a signal called SpkrOut. This signal is intended to audibly signal the user, and typically uses a tone burst. Some modem vendors alternately generate a call progress audio signal and drive the PCMCIA SpkrOut term with it. Within the output block of the audio codec, this signal is fed through a step attenuator (within PCMCIA interface 680), and is then injected into both left and right output channels in the output mixer block.

As with the A/D input gain section, since it is likely that the output attenuator control values will be adjusted during playback, care must be taken to minimize any audible artifacts due to attenuation changes.

Each of the stereo output pin groups consists of a left/right pair and an associated common return path. The output signals for each pair are referenced to the corresponding output common return pin.

The manner in which the audio output of the present audio codec is coupled to output circuitry differs in significant respects from the prior art. Referring to FIG. 18, in a conventional audio codec, the equivalent of a simple switch S is used to couple the audio output of the audio codec to the output circuitry. As shown in the waveform diagram of FIG. 19, when the switch is opened or closed, a "pop" results.

Figure 20:
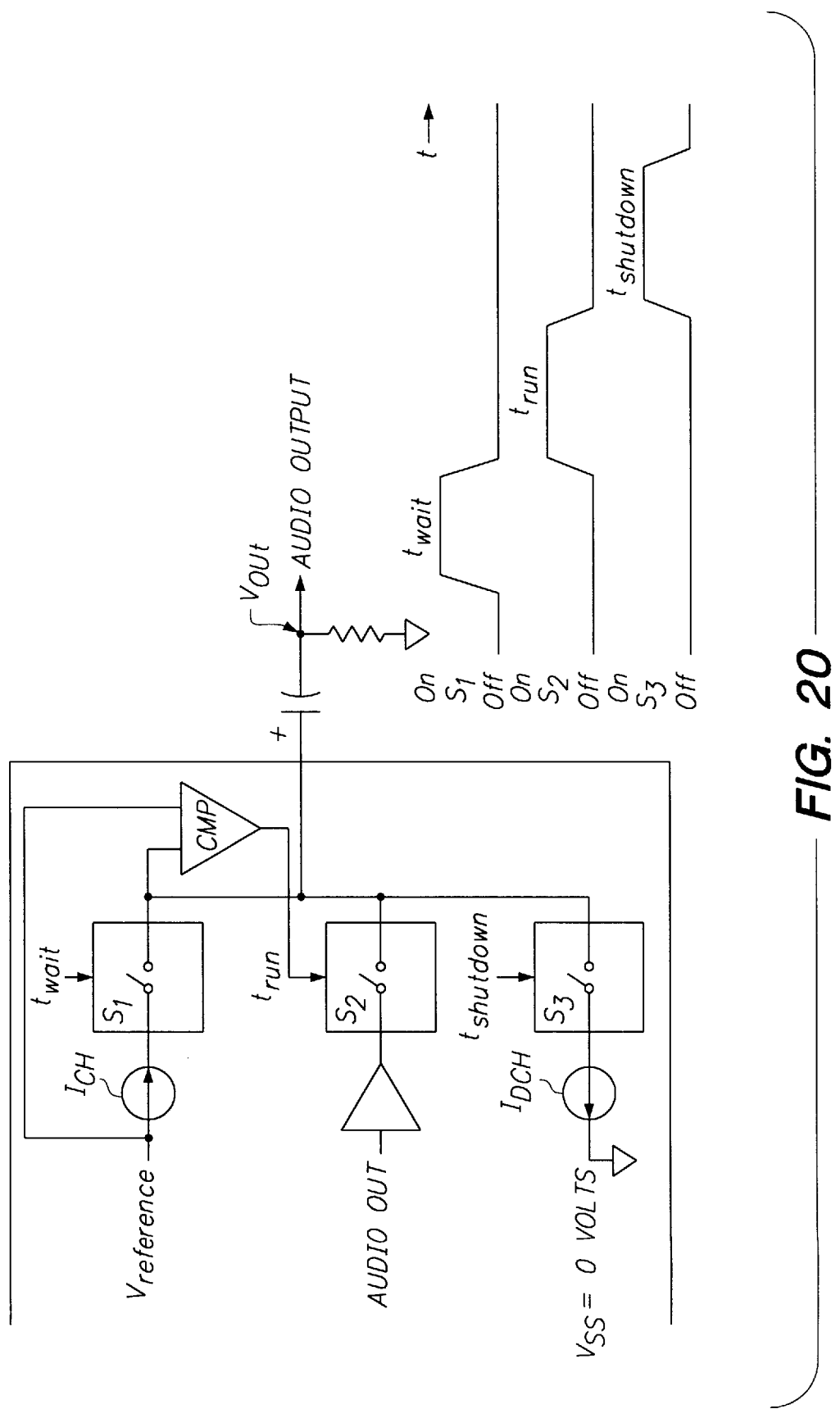
FIG. 20 is a simplified diagram of an output circuit for an audio codec in accordance with the present invention.

The manner in which the audio output of the present audio codec is coupled to the output circuitry is shown in FIG. 20.

Instead of a single switch, three switches (S1, S2, S3) are provided and controlled in accordance with the various power management states of the audio codec, described hereinafter. All of the switches are coupled in common to the output circuitry. The switch S2 is comparable to the switch S of FIG. 18 and is turned on during a "run" state for a period $t_{run}$. A switch S1 is coupled through a controlled current source $I_{CM}$ to the reference voltage $V_{reference}$ and is turned on during a "wait" state for a period $t_{wait}$. A switch S3 is coupled through a controlled current sink $I_{DCM}$ to Vss=0V and is turned on during an "analog shutdown" state for a period $t_{shutdown}$.

Referring to FIG. 21, before the switch S2 is closed, coupling the audio output to the output circuitry, a waiting period is enforced in which the switch S1 is closed, charging up the capacitor of the output circuitry at a controlled rate. The usual "pop" is therefore greatly reduced. Similarly, before or at substantially the same time as the switch S2 is opened, decoupling the audio output from the output circuitry, the switch S3 is closed, discharging the capacitor of the output circuit at a controlled rate. Again, the usual "pop" is greatly reduced. The coder output voltage is monitored to assure the switching levels of the S1 to S2 transition and the S2 to S3 transition occurs so as to minimize pops. In one embodiment, a comparator CMP is used to monitor the output voltage in order to determine when the voltage has reached the reference voltage level. Only then is the codec allowed to enter the run state such that the switch S2 is closed.

Referring again to FIG. 3, the serial interface and control block 330 is responsible for controlling the entire operation of the audio codec. Reset, input and output calibration circuitry, and control registers all reside within the block 331. The serial interface 333 has four general-purpose digital inputs and two general-purpose digital outputs. These six lines are used to receive status and to control the audio system through the host interface. The digital inputs can be used to sense the presence or absence of a plug in a jack, such as a headphone output or a line input jack. The digital outputs can be used to enable or disable peripherals to the audio codes, such as a speaker amplifier.

In one embodiment, the audio codec of FIG. 3 uses a variant of a serial interface protocol used in a known audio codec found in computers manufactured by the present assignee. This protocol defies a 256-bit serial bitstream (a frame) which coincides with one sampling period. The audio codec responds to a set of 64 bits (one subframe) which defines two channels of 20-bit audio data (going to the stereo D/A) and 24 bits of auxiliary control data. The audio codec also produces 40 bits of audio data (from the stereo A/D) and 24 bits worth of status information during the same subframe, in response to the input data stream.

Figure 7:
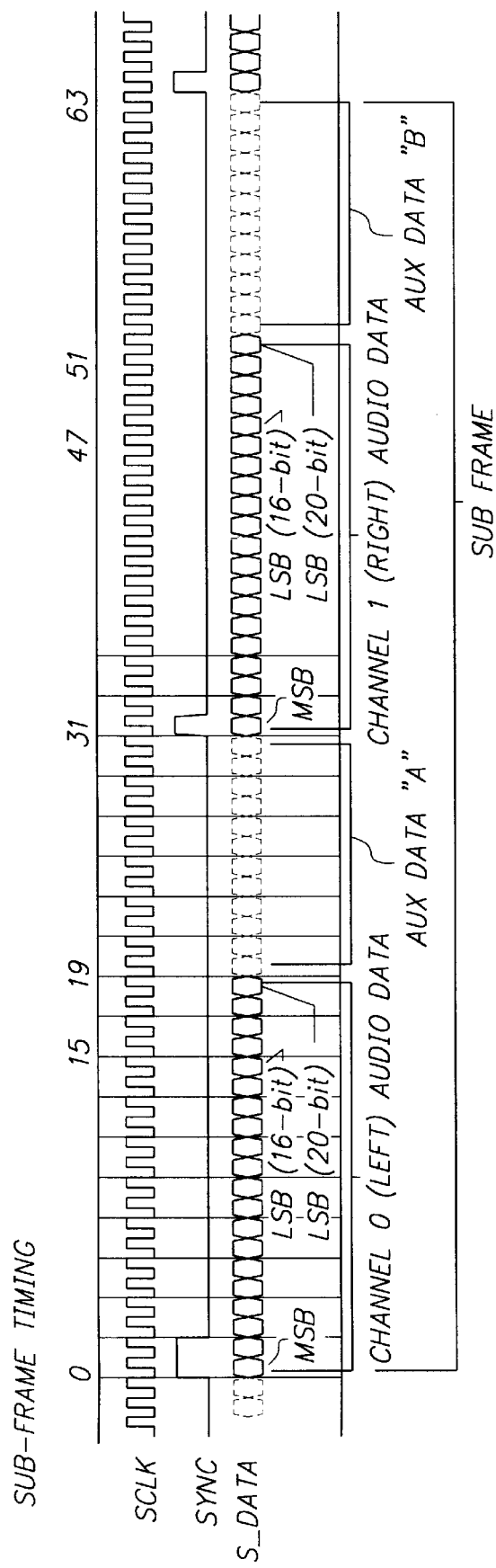
FIG. 7 is a timing diagram of serial input bit assignments in accordance with a known serial interface protocol.
Figure 8:
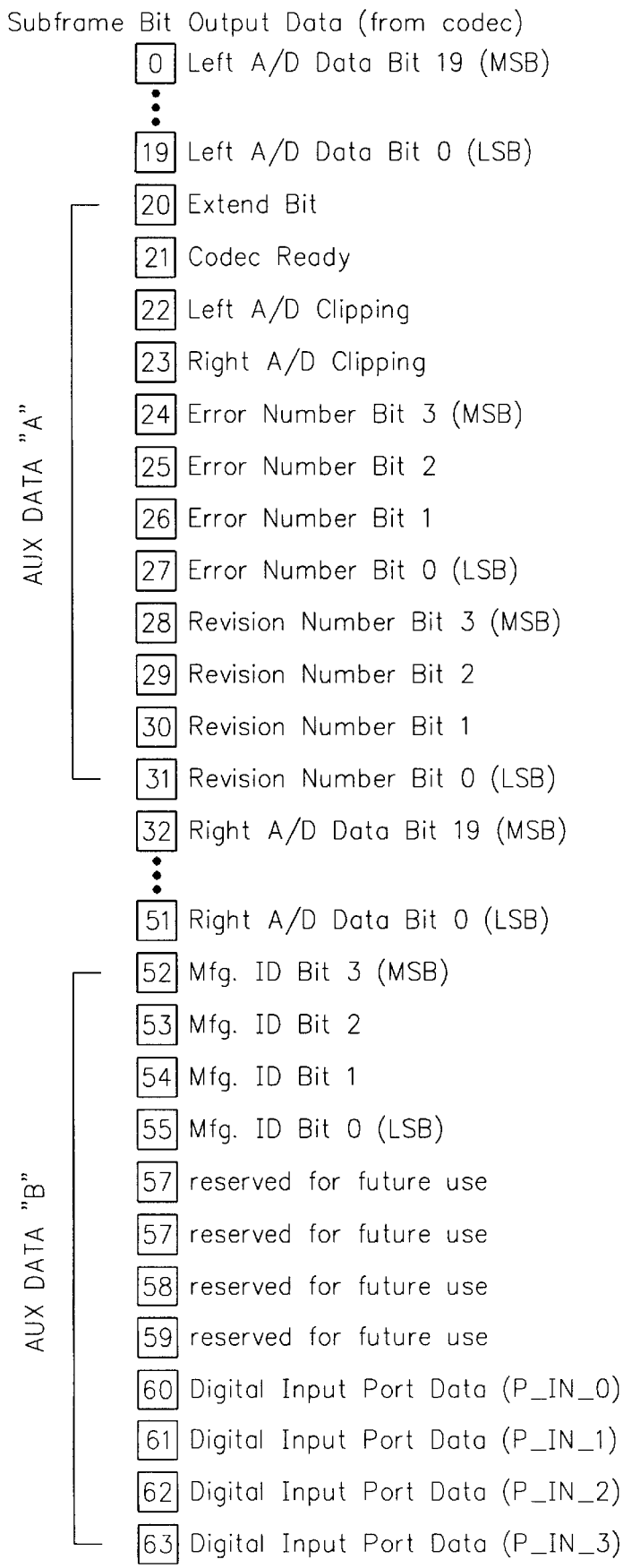
FIG. 8 is a diagram of a status information data format of the audio codec of FIG. 3.

The serial input bit assignments in accordance with the serial interface protocol are shown in FIG. 7. The mapping of the various status bits into the subframe locations is shown in FIG. 8. Normal status information includes such things as input clipping indicators, error codes, and parallel digital input bits received by the audio codec. As shown in FIG. 8, subframe bit numbers 60 through 63 are the means by which the state of these inputs is transmitted back to the host. These inputs are latched at the beginning of the active subframe.

A "Codec Ready" indicator for the A/D converters is included in the serial output data stream produced by the audio codec and is set to "0" until enough clocks have passed since the last reset for the A/D converter to produce valid data (i.e., the calibration cycle has completed and the full latency of the digital filters has passed). "Codec Ready" is also forced low (=0) whenever a calibration takes place. "Codec Ready" is high (=1) whenever the audio codec can provide valid data or will accept data and provide analog outputs within specification limits.

Figure 9:
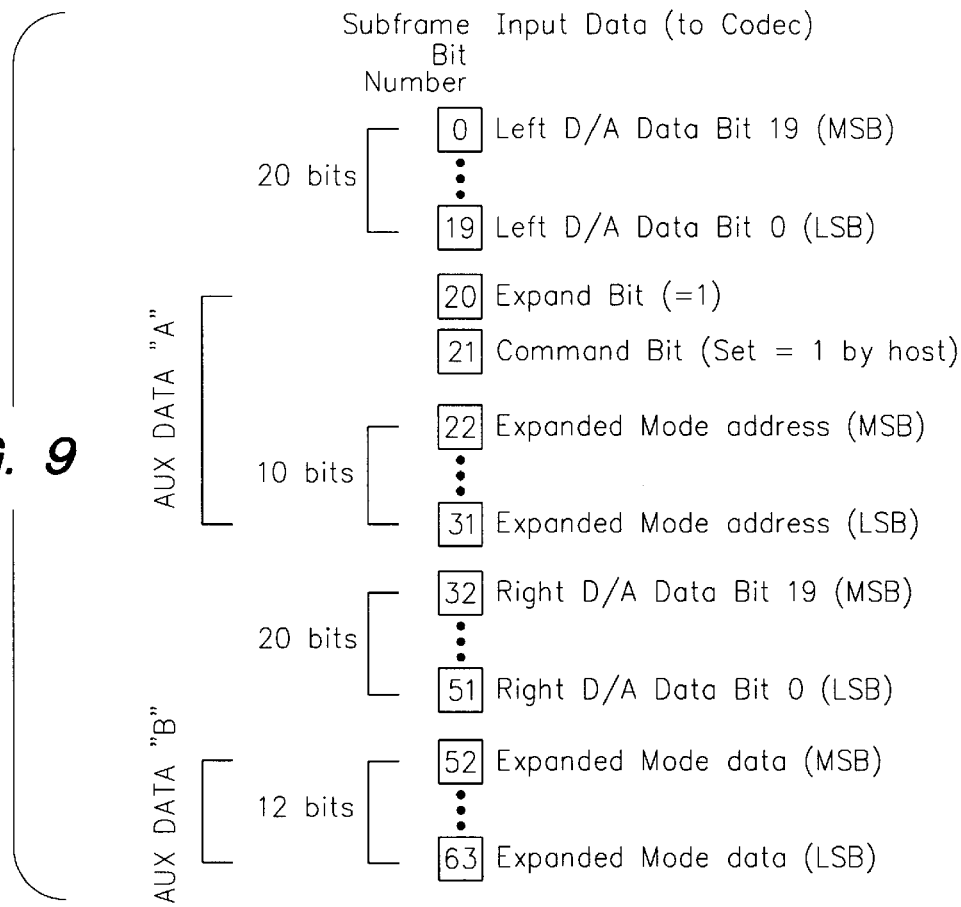
FIG. 9 is a diagram of serial input bit assignments in an expanded data mode of the audio codec of FIG. 3.

In the case of the audio codec of FIG. 3, the on-chip functions which are controlled by the serial bitstream may only be accessed through a special expanded data protocol. In normal operation, the expanded data (control) messages come fairly infrequently from the serial bus master. The mechanism of the expanded data mode serial data transmission is an address/data protocol, the format of which is shown in FIG. 9. The "Command" bit (e.g., bit 21) is set to 1 by the host. Some number of bits (e.g., 10 bits) which follow the "command" bit in the serial bitstream correspond to an expanded mode data register address. For a command message (i.e., an expanded mode data register write), the actual data is supplied to the audio codec later in the bitstream, e.g., in subframe bits 52 through 63. The appropriate internal register in the audio codec will be updated to the new data value on the following frame boundary.

Figure 10:
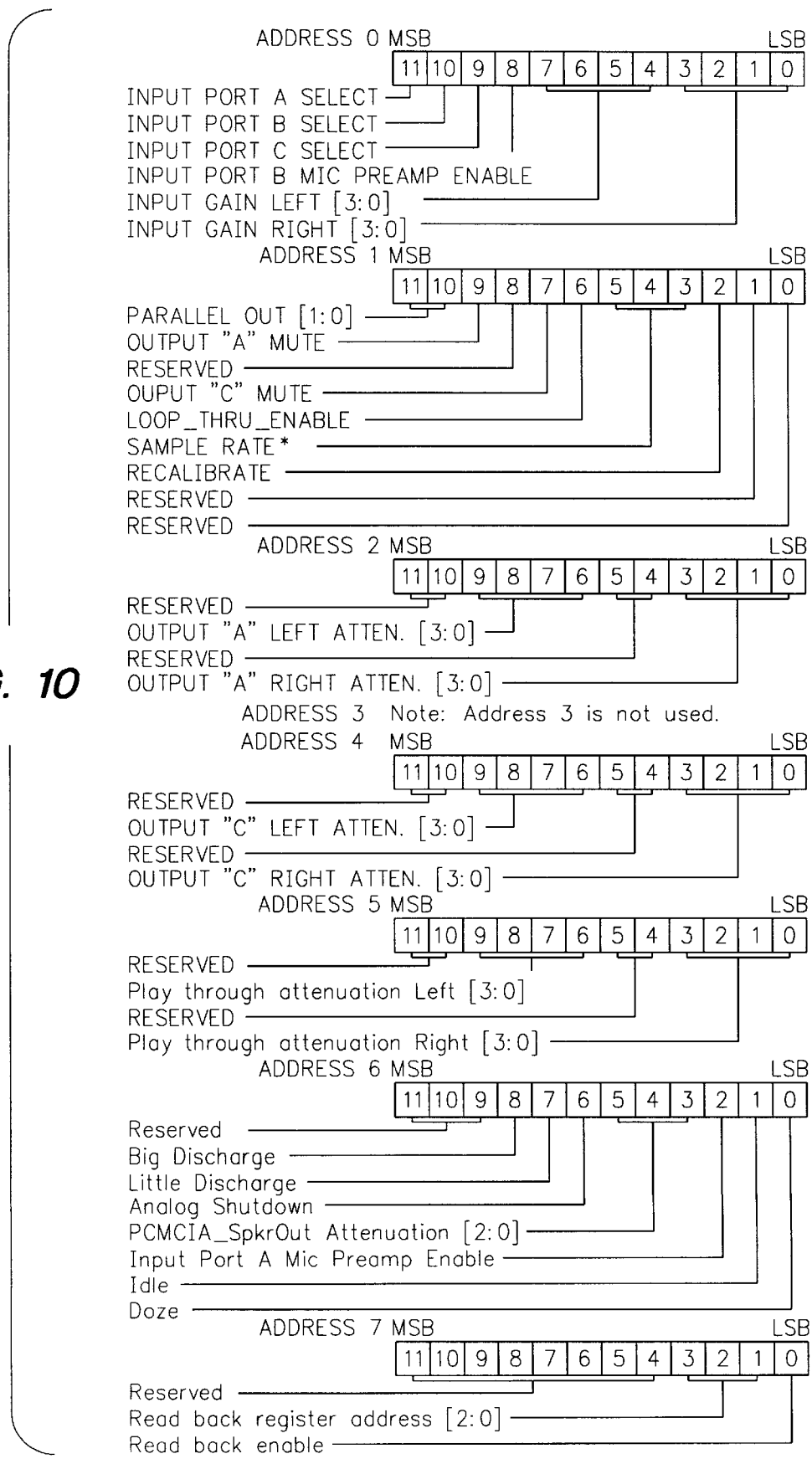
FIG. 10 is an address map of expanded data mode control registers of the audio codec of FIG. 3.

An address map of expanded data mode control registers in accordance with one embodiment of the audio codec is shown in FIG. 10.

Address 0 to Address 4 control various operating aspects of audio handling circuitry of the audio codec of FIG. 3.

Address 5 allows control of a stereo attenuator that controls the play-through signal level, used for sidetone generation or for multiple pass recording.

Figure 11:
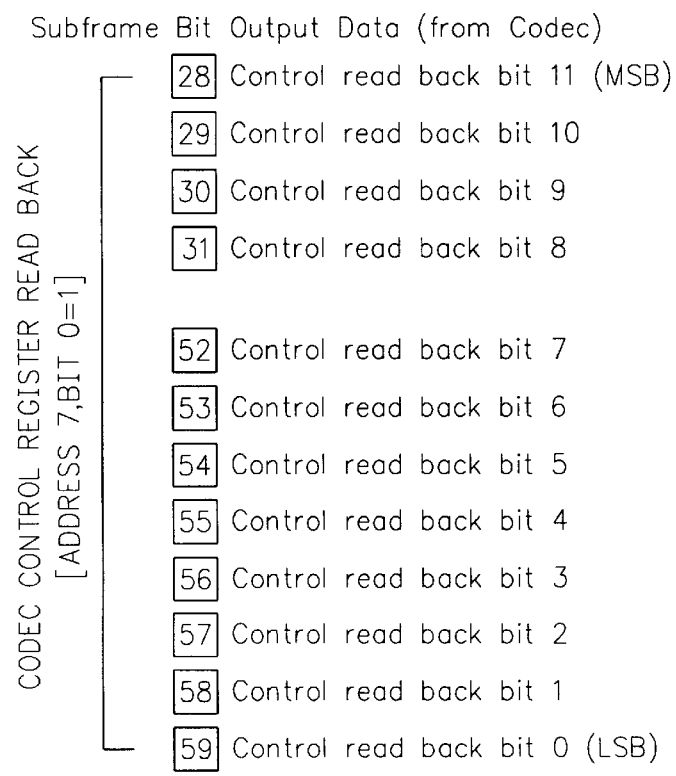
FIG. 11 is diagram of bit assignments in accordance with a register readback function.

Address 7 controls the register read back function. When Address 7 Bit 0=0, the audio codec returns normal status information. When Address 7 Bit 0=1, the audio codec returns the current value of the control register pointed to by the value in Address 7 Bits 3, 2, 1 by multiplexing the AUX DATA "B" field with the selected register value, as shown in FIG. 11.

Figure 12:
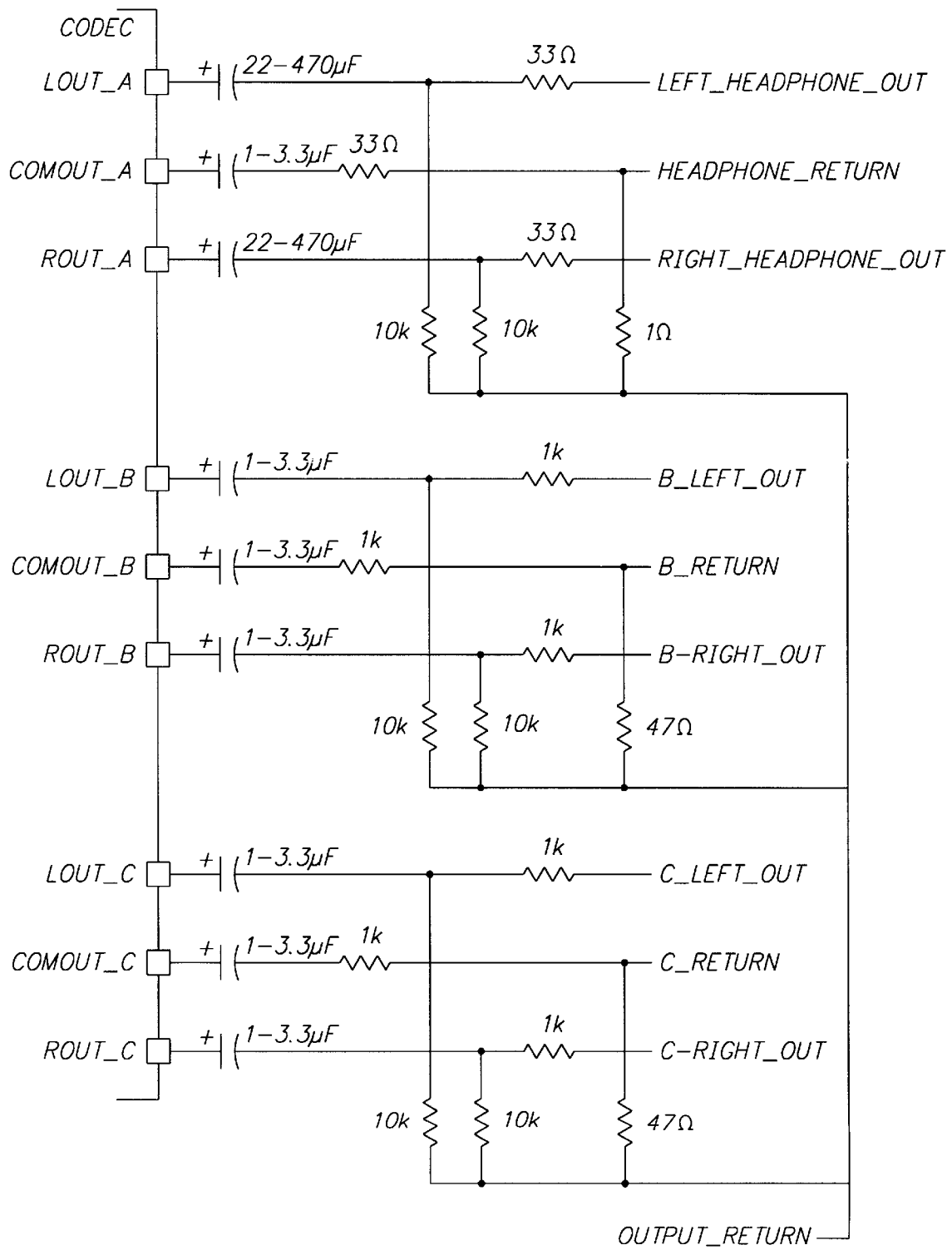
FIG. 12 is a schematic diagram of typical output circuitry used with the audio codec of FIG. 3.

Address 6 allows control of various different functions. Referring first to FIG. 12, in a typical configuration, the audio codec might be integrated within a system having three different system requirements as shown. Port A drives a headphone jack, Port B drives a fixed level line output, and Port C drives a variable level line output. Note that the output port coupling capacitors of Port A are much greater than the output port coupling capacitors of Ports B and C. Address 6 Bits 8 and 7 provide for controlled discharge of the output port coupling capacitors of Port A. Bit 8 (Big Discharge) is normally set low (=0). When it is set high (=1), a programmable current sink within the differential output stage and headphone driver of FIG. 6 is enabled for discharging "big" output Port A coupling capacitors (e.g., 200 uF and up). Bit 7 (Little Discharge) is also normally set low. When it is set high, the programmable current sink is enabled for discharging "little" output Port A coupling capacitors (e.g., less than 200 uF).

One of the foregoing bits will be set during the analog shutdown state, described more particularly hereinafter. The provision of two different discharge rates allows for the fastest possible discharge of the output coupling capacitors consistent with the requirement of minimizing any audible pop.

Referring again to FIG. 10, the audio codec provides a power-down input PWD that may be used to shutdown the sound system quietly. However, not all systems may be able to take advantage of this feature. Therefore, Bit 6 of Address 6, Analog Shutdown, may be set high to disable analog power. Set low, analog power is enabled.

Bits 5–3 of Address 6, the PCMCIA SpkrOut, control the amount of this signal summed into the output mix. Bit 2, the Port A Line/Mic gain select, enables an additional preamplifier for input Port A.

Bits 1 and 0 of Address 6, IDLE and DOZE, are used together to implement the various audio codec power management modes. The audio codec may be placed in RUN, IDLE, DOZE, or SLEEP mode to optimize power consumption and functionality. The four principal power management states are defined as follows:

RUN: All functions are enabled.

IDLE: A minimal amount of the serial interface and analog circuitry is kept on. This allows host access to the IDLE and DOZE programmable functions. IDLE mode is a low power mode that maintains the charge on all the needed coupling capacitors so that when the audio codec is put into RUN mode, no clicks or pops result.

DOZE: Serial interface and analog input, play-through, and output functions are enabled; the A/D and D/A converters are off. This allows the sound system to "play through" internal or external sources, like CDs.

SLEEP: The audio codec is forced into a minimal power mode by forcing PWD low.

Other power management states include RESET, WAIT and ANALOG SHUTDOWN.

Figure 13:
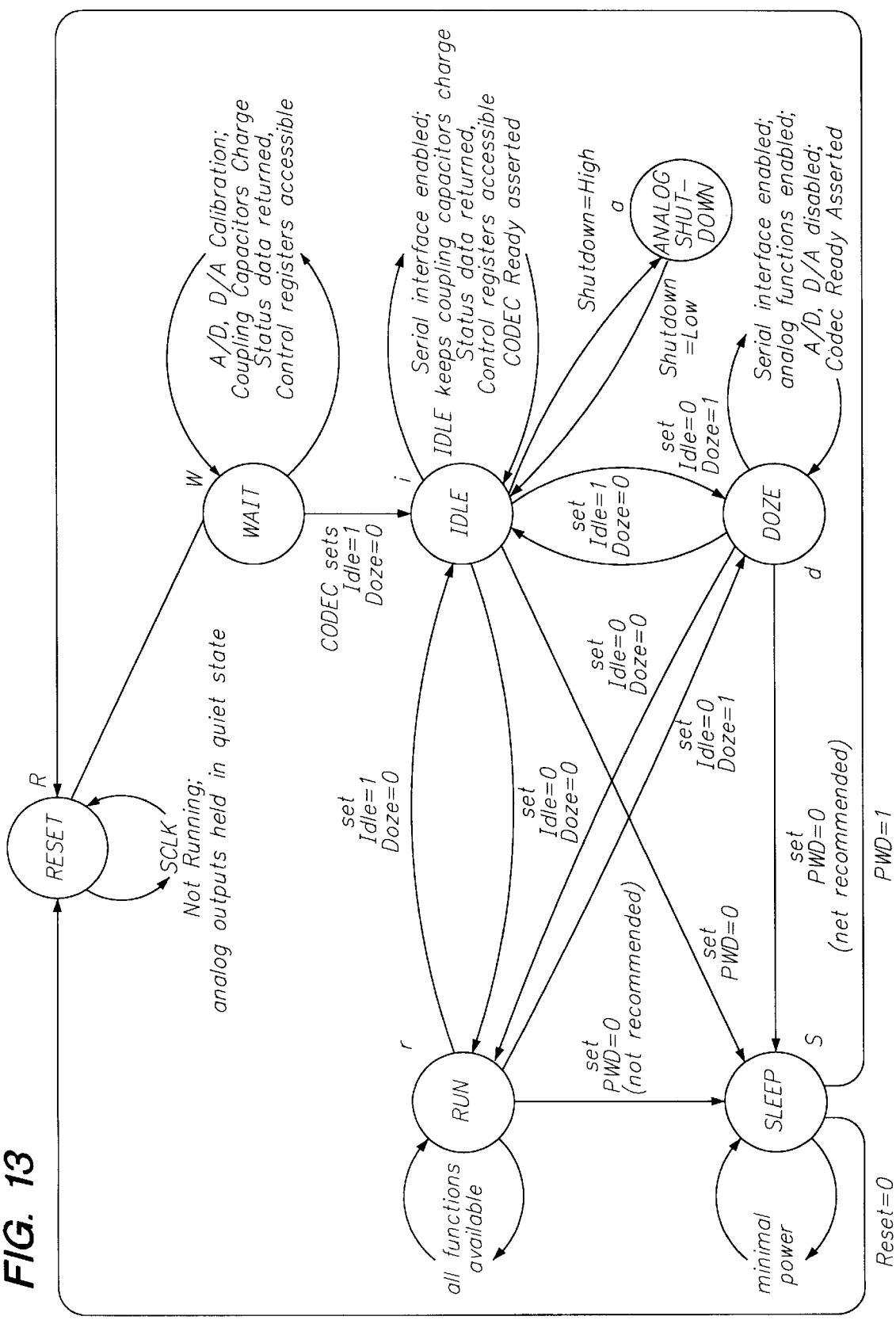
FIG. 13 is a state diagram of power management states of the audio codec of FIG. 3.

A state diagram of the power management states is shown in FIG. 13. Ultimately, the goal of power management is to put the audio codec in the RUN state, in which all audio functions are available. The other states may be regarded as intermediate states. Each state has well-defined transition rules relating it to other states. Some transitions are not allowed for reasons of simplicity of implementation or to preclude audible artifacts.

RESET starts the initialization of the audio codec. This state may be entered by assertion of a hardware reset signal, or by assertion of a power control signal (PWD). RESET is maintained until the serial clock SCLK is stable. In RESET, all analog outputs are held in a quiet state.

When the audio codec is brought out of the RESET state (either a power-on "cold" reset or "warm" reset), there is no guarantee that the SCLK signal will be stable or even active. A "warm" reset may be either an explicit reset by the host (for example, when the host changes the sample frequency), or an implicit reset in response to an error message from the audio codec. In either case, the audio codec should be recalibrated. Timelines for the sequence of events to be followed coming out of a RESET state for each of the foregoing types of resets are set forth in Appendix I.

WAIT is entered once SCLK is running. In the WAIT state, the audio codec performs internal housekeeping. These activities include calibration of the A/D and D/A converters and charging of the analog output coupling capacitors. The capacitors are charged at a controlled rate by a fixed current so a "pop" will not be coupled to the audio outputs. The host interface also becomes accessible to host software during the WAIT state. Host software is the means by which most of the other state transitions are initiated. The host must have PWD high (=1) to enter the WAIT state.

IDLE mode is set by the audio codec when it has completed its WAIT state tasks. When IDLE, the audio codec asserts CODEC READY to tell the host software that the audio codec may be put in alternative modes. IDLE is, in itself, a low power state that still maintains the state of the audio codec. The IDLE state can also be forced by asserting Address 6, Bit 1.

DOZE mode is initiated by host software (by asserting Address 6, Bit 0), and defines an intermediate power state in which the A/D and D/A circuitry is turned off, but the balance of the analog audio processing circuitry is turned on. This is useful for system implementations that have internal CD drives, where the customer may wish to use the audio CD play capability with no other computer sound requirements.

With PWD high and IDLE and DOZE both deasserted, the audio codec is in the RUN mode. RUN mode consumes full power, and all functions are available. The time required for the audio codec to move between IDLE, RUN, and DOZE is quite short. Because the audio artifacts that could occur at each transition have been minimized, the host can freely move between states to conserve power. The audio codec is also put in RUN mode if both IDLE and DOZE are asserted.

SLEEP is entered by setting the external power control signal (PWD) low. Since the host must initiate this operation, it can make the transition in good order. That is, any sound task can be left to complete, and when sound functions are finished, SLEEP may be forced. SLEEP is the lowest power mode in which the audio codec is still biased.

ANALOG SHUTDOWN is an adjunct mode useful for desktop machines that will typically not have the PWD power control. When ANALOG SHUTDOWN is asserted (Address 6, Bit 6), preferably from the IDLE state, the analog functions of the audio codec are disabled, the analog reference voltage is slowly decreased toward zero, and charge is removed from the analog output coupling capacitors at a pre-determined rate. All of these actions allow the audio system to be turned off without coupling annoying "pops" or "clicks" to the audio outputs. Power (AVDD and DVDD) may be removed a short time later.

Appendix II contains a timing diagram showing the manner in which the different states are entered.

The invention having been thus described, it will be appreciated by those of ordinary skill in the art that the invention can be embodied in other specific forms without departing from the spirit or essential character thereof. The present description is therefore considered in all respects to be illustrative and not restrictive. The scope of the invention is indicated by the appended claims, and all changes that come within the meaning and range of equivalents thereof are intended to be embraced therein.

APPENDIX I

IDLE TO RUN SEQUENCE

| Step | Time | Event | Action |
|---|---|---|---|
| 0 | $t_0$ | IDLE = 0<br>DOZE = 0 | Supply current increases to $\leq$ 80 mA;<br>Outputs muted |
| 1 | $t_1 > t_0$ | Bus is running normally | All interface functions are available to host |

-continued

APPENDIX I

RUN TO IDLE SEQUENCE

| Step | Time | Event | Action |
|---|---|---|---|
| 0 | $t_0$ | D/A data set to 0x0000; Outputs muted | Outputs muted |
| 1 | $t_1$ | DOZE = 0; IDLE = 1 | Outputs keep coupling capacitors charged; Supply current $\leq$ 15 mA |

IDLE TO DOZE SEQUENCE

| Step | Time | Event | Action |
|---|---|---|---|
| 0 | $t_0$ | IDLE = 0; DOZE = 1 | Outputs muted |
| 1 | $t_1 > t_0$ | Bus is running normally | All interface functions are available to host A/D, D/A disabled; Supply current increases $\leq$ 40 mA |

The DOZE to RUN sequence and RUN to DOZE sequence are comparable to, respectively, the IDLE to RUN sequence and the RUN to IDLE sequence.

RUN, IDLE OR DOZE TO SLEEP SEQUENCE

| Step | Time | Event | Action |
|---|---|---|---|
| 0 | $t_0$ | D/A data set to 0x0000; Outputs muted | Outputs muted |
| 1 | $t_1 > t_0$ | PWD asserted = 0; SCLK and SYNC may stop in either state | Outputs muted Serial Port no longer responds; SDOUT goes to high impedance, POUT0, 1 go to high impedance Supply current decreases to $\leq$ 150 $\mu$A |

N.B: RUN to SLEEP and DOZE to SLEEP are not recommended as they may couple clicks or pops to the analog output ports.

RESET TO IDLE SEQUENCE (NORMAL CODEC RESET)

| Step | Time | Event | Action |
|---|---|---|---|
| 0 | $t_0$ | RESET asserted; PWD = 1 | POUT0, 1 forced to high impedance Analog outputs muted |
| 1 | $t_1$ | RESET deasserted | |
| 2 | $t_2 > t_1$ | WAIT State entered | A/D, D/A calibrated; Codec Ready = 0; All coupling capacitors are charged quietly |
| 3 | $t_1 + t_{Ri}$ | Screamer in IDLE | Supply current $\leq$ 10 mA Reference has settled; Analog circuits have been quietly initialized; All interface functions are available to host; IDLE set = 1; IDLE set = 0 |

APPENDIX II

"COLD RESET" SEQUENCE

| STEP | TIME | EVENT | ACTION |
|---|---|---|---|
| 0 | $t_0$ | POWER SUPPLY STABILIZES (i.e., Vdd ≧ 4.5V), RESET-ASSERTED. | OUTPUT MUTE AUTOMATICALLY ACTIVATED |
| 1a* | (STEP 0) + (~25 μs to ~20 ms) | RESET-GOES INACTIVE | (OUTPUT MUTE STAYS ACTIVE) |
| 1b* | (STEP 0) + (~25 μs to ~20 ms) | SCLK, FSYNC STABILIZED | (OUTPUT MUTE STAYS ACTIVE) |
| 2 | (STEP 1a or STEP 1b, whichever occurs latest) + (~10 ms) | CALIBRATION CYCLE INITIATED BY BUS MASTER | CALIBRATION CYCLE BEGINS, OUTPUT MUTED |
| 3 | (STEP 2) + (1024 FRAMES MAXIMUM) | | CALIBRATION CYCLE COMPLETED, OUTPUT MUTE STAYS MUTED, CODEC SIGNALS END OF CALIBRATION BY SETTING THE CODEC READY BIT. |

*NOTE: THERE IS NO GUARANTEED ORDER IMPLIED BETWEEN STEPS 1a and 1b

"EXPLICIT WARM RESET" SEQUENCE

| STEP | TIME | EVENT | ACTION |
|---|---|---|---|
| 0 | $t_0$ | BUS MASTER ACTIVATES Screamer OUTPUT MUTES | ALL OUTPUTS MUTED |
| 1 | $t_1$ (> $t_0$) (THIS MAY BE SKIPPED IF ON A FRAME BOUNDARY) | BUS MASTER HOLDS SCLK AT LOGICAL '0' FOR LONGER THAN THE SPECIFIED MAX. SCLK $T_{Low}$ | (OUTPUT MUTE STAYS ATIVE) |
| 2 | $t_2$ (> $t_0$) | BUS MASTER CHANGES SCLK FREQUENCY, BUS RETURNS TO CORRECT SERIAL FORMAT | (OUTPUT MUTE STAYS ACTIVE) |
| 3 | $t_3$ ($t_2$ + 2 FRAMES) | NEW SAMPLE RATE VALUE WRITTEN INTO CONTROL REGISTER | Screamer CONFIGURES FOR NEW SAMPLE RATE VALUE IF APPROPRIATE (OUTPUT MUTE STAYS ACTIVE) |
| 4 | $t_4$ (≧ $t_3$) | CALIBRATION CYCLE INITIATED BY BUS MASTER | CALIBRATION CYCLE BEGINS, OUTPUT MUTED |
| 5 | $t_5$ ($t_4$) + (1024 FRAMES MAXIMUM) | | CALIBRATION CYCLE COMPLETED, OUTPUT MUTE STAYS MUTED, CODEC SIGNALS END OF CALIBRATION BY SETTING THE CODEC READY BIT. |

"IMPLICIT WARM RESET" (ERROR) SEQUENCE

| STEP | TIME | EVENT | ACTION |
|---|---|---|---|
| 0 | $t_0$ | FRAME SYNC OR SERIAL PORT ERROR OCCURS | ALL OUTPUTS MUTED, ALL SERIAL OUTPUT GOES TO Hi-Z MODE AT END OF CURRENTLY ACTIVE SUBFRAME (OUTPUT MUTE STAYS ACTIVE, SERIAL OUTPUT STAYS IN Hi-Z MODE) |
| 1 | $t_1$ (> $t_0$) | BUS RETURNS TO CORRECT SERIAL FORMAT | SERIAL OUTPUT TO ACTIVE STATE, APPROPRIATE ERROR CONDITION SIGNALED TO HOST (OUTPUT MUTE STAYS ACTIVE) |
| 2 | $t_2$ ($t_1$ + 1 FRAME) | | ERROR CONDITION MESSAGE REMOVED (IF APPROPRIATE) |
| 3 | $t_3$ ($t_1$ + 2 FRAMES) | HOST MAY NOW WRITE INTO CONTROL | CALIBRATION CYLCE BEGINS, OUTPUT MUTED |
| 4 | $t_4$ (≧ $t_3$), (OPTIONAL) | CALIBRATION CYCLE INITIATED BY BUSMASTER | |
| 5 | $t_5$ ($t_4$) + (1024 FRAMES MAXIMUM | | CALIBRATION CYCLE COMPLETED, OUTPUT MUTE STAYS MUTED, CODEC SIGNALS END OF CALIBRATION BY SETTING THE CODEC READ BIT. |

What is claimed is:

1. An audio codec having multiple power management states including a Wait State, a Run State, and a Shutdown State, comprising: circuitry for generating a reference voltage including means for controlling the slew rate of said reference voltage;

an audio output signal;

capacitive coupling means coupling the audio output signal to a circuit node;

first switching means operative during the Wait State to apply a charging current to the circuit node;

means for preventing a transition from the Wait State to the Run State until the circuit node has reached a reference voltage level;

second switching means operative during the Run State for applying an audio signal to the circuit node; and third switching means operative during the Shutdown State to apply a discharge current to the circuit node.

* * * * *

UNITED STATES PATENT AND TRADEMARK OFFICE
CERTIFICATE OF CORRECTION

PATENT NO. : 5,887,177
DATED : Mar. 23, 1999
INVENTOR(S) : Lawrence F. HEYL

It is certified that an error appears in the above-identified patent and that said Letters Patent is hereby corrected as shown below:

```
Title page, item [57],
Abstract; on line six, delete "codes", and insert --codec--.
```

Signed and Sealed this

Thirty-first Day of August, 1999

*Attest:*

Q. TODD DICKINSON

*Attesting Officer*     *Acting Commissioner of Patents and Trademarks*